(12) United States Patent
Derstadt (10) Patent No.: US 10,089,409 B2
(45) Date of Patent: Oct. 2, 2018

(54) EVENT-TRIGGERED DATA QUALITY VERIFICATION

(71) Applicant: Microsoft Technology Licensing, LLC, Redmond, WA (US)

(72) Inventor: Jeffrey Michael Derstadt, Sammamish, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 709 days.

(21) Appl. No.: 14/306,999

(22) Filed: Jun. 17, 2014

(65) Prior Publication Data

US 2015/0310132 A1    Oct. 29, 2015

Related U.S. Application Data

(63) Continuation-in-part of application No. 14/264,966, filed on Apr. 29, 2014.

(51) Int. Cl.
| | | |
|---|---|---|
| G06F 7/00 | (2006.01) | |
| G06F 17/30 | (2006.01) | |
| G06Q 10/00 | (2012.01) | |
| G06Q 50/00 | (2012.01) | |

(52) U.S. Cl.
CPC ....... *G06F 17/30943* (2013.01); *G06Q 10/00* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,840,581 B2 | 11/2010 | Ross et al. | |
| 8,140,570 B2 | 3/2012 | Ingrassia | |
| 8,375,029 B2 | 2/2013 | Cui | |
| 8,443,189 B2 | 5/2013 | Li et al. | |
| 2006/0242178 A1 | 10/2006 | Butterfield | |
| 2007/0011134 A1 | 1/2007 | Langseth et al. | |
| 2008/0104060 A1 | 5/2008 | Abhyankar et al. | |
| 2009/0043649 A1 | 2/2009 | Wright | |
| 2010/0138388 A1 | 6/2010 | Wakeling et al. | |
| 2011/0066602 A1 | 3/2011 | Studer et al. | |
| 2012/0166285 A1* | 6/2012 | Shapiro ............. | G06Q 30/0251 705/14.58 |
| 2012/0310884 A1 | 12/2012 | Tennant | |
| 2012/0310990 A1 | 12/2012 | Viegas | |
| 2013/0031183 A1* | 1/2013 | Kumar ............... | H04L 12/5825 709/206 |

(Continued)

OTHER PUBLICATIONS

Office Action dated Dec. 13, 2016 issued in U.S. Appl. No. 14/264,966.

(Continued)

*Primary Examiner* — Thu Nga Nguyen
(74) *Attorney, Agent, or Firm* — Workman Nydegger (57) ABSTRACT

A method is directed to associating quality metadata with underlying data. The method includes, for one or more data items, a computing system identifying one or more threshold conditions related to the data items. The computing system determines that the one or more threshold conditions related to the data items have been met. As a result of determining that the one or more threshold conditions related to the data items have been met, the computing system associates quality metadata with the data items.

20 Claims, 4 Drawing Sheets

(56) References Cited

U.S. PATENT DOCUMENTS

| | | | |
|---|---|---|---|
| 2013/0150087 A1* | 6/2013 | Kosuru | G06Q 30/02 455/456.3 |
| 2013/0346163 A1 | 12/2013 | Kemmer et al. | |
| 2014/0025695 A1 | 1/2014 | Bickle et al. | |
| 2014/0114968 A1 | 4/2014 | Anderson | |
| 2014/0181637 A1* | 6/2014 | Eldawy | G06Q 50/01 715/234 |
| 2014/0188921 A1* | 7/2014 | Thomason | G06F 21/6245 707/758 |
| 2015/0012525 A1* | 1/2015 | Lindsay | G06F 17/3053 707/722 |
| 2015/0103672 A1 | 4/2015 | Stuart | |

OTHER PUBLICATIONS

Hartig, Olaf, et al., "Using Web Data Provenance for Quality Assessment".

Moreau, Luc, "The Foundations for Provenance on the Web", Foundations and Trends in Web Science, vol. 2, Nos. 2-3 (2010) 99-241.

Mendes, Pablo, et al., "Sieve: Linked Data Quality Assessment and Fusion", LWDM2012 Mar. 26-30, 2012, Berlin, Germany.

Umuhoza, Denise, et al., "Trustworthiness Assessment of Knowledge on the Semantic Sensor Web by Provenance Integration", 2012 26th International Conference on Advanced Information Networking and Applications Workshops.

Flouris, Georgos, et al., "Using Provenance for Quality Assessment and Repair in Linked Open Data".

Office Action dated Jul. 6, 2017 issued in U.S. Appl. No. 14/264,966.
Office Action dated Jan. 11, 2018 issued in U.S. Appl. No. 14/264,966.

* cited by examiner

EVENT-TRIGGERED DATA QUALITY VERIFICATION

CROSS-REFERENCE TO RELATED APPLICATIONS

This application is a continuation in part of prior application Ser. No. 14/264,966 filed Apr. 29, 2014 titled "USING LINEAGE TO INFER DATA QUALITY ISSUES", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive data from other computing system.

Interconnection of computing systems has resulted in the generation and broad distribution of massive amounts of data. Indeed, much of modern society obtains large amounts of data for consumption through so called "Internet searching."

However, due to the architecture of the Internet and other wide area networks, there are few if any quality controls on data that is generated. Much data that can be obtained may include information that is intentionally and patently false, information that is poorly assembled, information that mischaracterizes facts, information that is hearsay, information that has been generated by flawed algorithms, or information that has any one of a number of different flaws. Indeed, with the perceived need to generate massive amounts of new data, even reputable data sources have fallen prey to publishing low quality data. Thus, it may be useful to have an indicator of data quality associated with data.

Data quality can be determined and associated in metadata with data where the quality metadata gives an indication of some quality aspect of the underlying data. For example, quality may describe accuracy, completeness, quality of a source of data, etc. However, there is often data that does not have data quality directly associated with it. Rather, the data is simply presented, and the user is left to determine the quality of the data. Generating quality metadata can, in and of itself, be a difficult and time consuming task. Thus, it would be incredibly difficult to generate quality metadata for all new data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for associating quality metadata with underlying data. The method includes, for one or more data items, a computing system identifying one or more threshold conditions related to the data items. The computing system determines that the one or more threshold conditions related to the data items have been met. As a result of determining that the one or more threshold conditions related to the data items have been met, the computing system associates quality metadata with the data items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments of the present invention are directed to determining when to associate quality metadata with underlying data. In particular, embodiments may identify a triggering event that causes actions to be performed to associate quality metadata with underlying data.

For example, in one embodiment, quality metadata can be associated with underlying data based on a particular amount of usage of the underlying data. For example, if the data is accessed a threshold number of time, shared a threshold number of times on a social media forum, or "liked" a threshold number of times on a social media forum, then quality metadata is generated and/or associated with the underlying data. For example, assume a story is shared on a social media site such as Facebook of Menlo Park, Calif., 9,999 times. However, there is no metadata associated with the story indicating its truthfulness. However, assume that a threshold is 10,000 shares. When the story is shared the 10,000th time, metadata will be generated or identified indicating the veracity of the story. Additionally, the metadata will be associated with the story. This can be done by creating a linkage between the metadata and the data and/or providing an indicator to an entity consuming the data indicating the quality of the data. In some embodiments, an indicator associated with the underlying data, such as a green light, green halo, etc., may be used to indicate high quality metadata, whereas a red light, flashing warning, or other indicator may be used to indicate low quality metadata.

In another embodiment, a determination may be made that the data is to be viewed by a particularly important user, such as a member of the management team of a company. In such case, quality metadata is generated or identified and associated with the underlying data such that the individual can evaluate the quality of the underlying data. In some embodiments, this could be triggered automatically. For example, a threshold of "organizational hierarchy" may be reached once a CEO or other entity, began looking at the data. This would trigger a quality operation causing quality metadata to be associated with underlying data.

Figure 1:
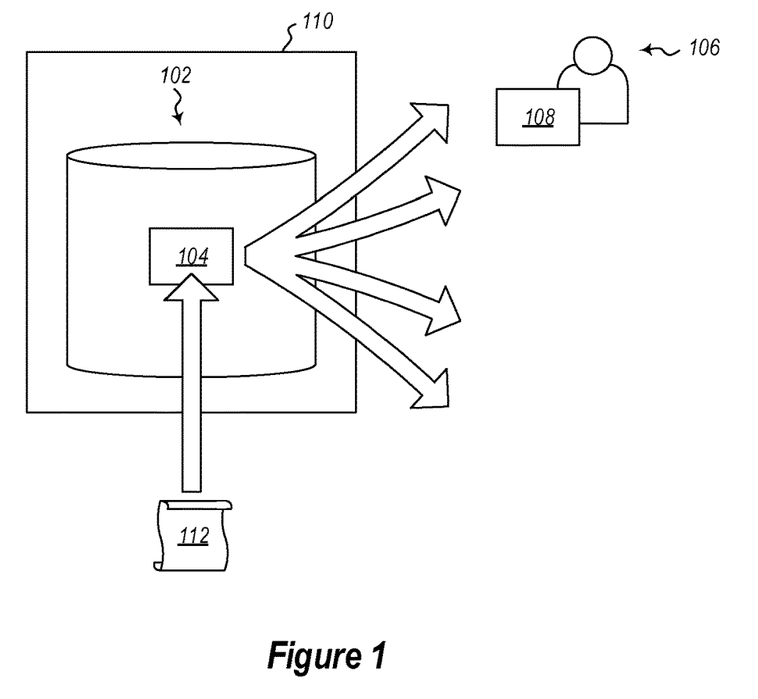
FIG. 1 illustrates distribution of a data item from a data store.

Referring now to FIG. 1, an example is illustrated. FIG. 1 illustrates a data store 102. The data store 102 stores various data items for distribution to various entities. For example, FIG. 1 illustrates a data item 104. The data item 104 may be distributed to various entities. In the example illustrated in FIG. 1, the data item 104 is distributed to a user 106 at a user device 108. The data store 102 may be part of an overall system 110 that is able to determine various factors associated with the data item 104. For example, the system 110 can determine to what entities the data item 104 will be distributed. Alternatively or additionally, the system 110 may be able to determine how the data item 104 has been accessed by various users. In yet another example, the system 110 may be able to determine the number of the entities accessing the data item 104. Etc.

The system 110 can also determine if certain threshold conditions are met. For example, in one embodiment, the threshold condition may be related to the entity or user role to which the data item will be delivered. For example, a rule may specify a threshold condition based on a user being in a management role of a company. If the data item 104 is intended to be delivered to the CEO of a company or some other member of the management group of the company, then the threshold condition may be met with respect to that rule. Alternatively, in another embodiment, a rule may specify a threshold number of users or entities accessing the data item 104. In yet another alternative embodiment, threshold rules may be associated with social networking interactions. For example, a threshold rule may be related to a number of times the data item is shared in a social networking setting. In alternative example, the threshold level may be related to a number of times the data item is liked in the social networking setting. In yet another alternative embodiment, threshold level may be related to the number of comments associated with the data item in a social networking setting. In particular, embodiments may include various modules and/or comparison logic for evaluating factors against various threshold rules. In some embodiments, thresholds may be determined with respect to lineage of data. For example, it may be the case that a data source itself is only utilized five times, but if two of the five downstream sources using the data are then accessed by a threshold 10,000 entities, then a data quality metadata association process could be triggered because any and/or all downstream uses of the data reached a pre-determined threshold. This lineage analysis can be performed for any appropriate factor for downstream data. Thus for example, number of downstream views, downstream likes, downstream shares, access of downstream data by particular entities, etc. may trigger a data quality metadata association process.

If the threshold condition(s) are met, then quality metadata 112 can be associated with the data item 104. Quality metadata describes the data quality level of the data in the data item 104. Data quality, can, but does not necessarily have a pre-defined metric. This metric can be a simple enumeration of High, Medium, or Low, or it can be a percent correct, a percent that follow a certain pattern, a percent complete, a relevance score, a freshness score, a grading based on granularity available, a precision score, etc., as illustrated in more detail below.

As noted, data quality may be related to any of a number of different factors. One such factor may be correctness of data. For example, data should accurately reflect what it purports to represent without errors.

Another factor may be completeness. Completeness relates to the inclusion of what might be considered important, necessary, and/or useful to be included in a data item. For example, it may be determined that address data should include street address, zip code, city, and state. If these cannot be identified in a data item, the data item may be of a lower quality. On a larger scale, a data item may have reports from several entities. If certain reports from certain entities are not included, then the data may have a lower quality as not being complete. On an even larger scale, statistical data may be included for countries. If data for one or more countries is missing, then the data may be determined to not be complete.

Another factor may be relevance. Relevance could represent any one of a number of different things. For example, data items from more socially "popular" data sources may be more relevant than other data items. Relevance may also be determined based on context. For example, in a system dealing with scientific observations, a data item mostly dedicated to music sales might be of less relevance.

Another factor may be freshness. Freshness refers to how recent the data is. This factor may vary based on the data item. For example, a data item having historical facts may not need to have been created or updated as recently as a current stock price data item to be considered "fresh".

Another factor may be granularity of what data is available. For example, a data source may be able to provide a broad range of granularity such as data representing an aggregation of data points as well as data about the individual data points. For example, a coarse granularity of data might indicate that 500,000 people purchased a particular product. A much finer granularity of data might indicate that Joe Smith purchased the particular product. Data with ranges of granularity or with finer granularity may be higher quality data than data of more coarse granularity.

Another factor may be precision. For example, data that is more precise may be of higher quality. For example, if a system provides scientific measurement data, data that has finer precision may be higher quality system than data with more coarse precision.

Another factor may be reputation of a data source of data. For example, a well-known and respected news source may produce so called "high quality" data while a lesser known news source may be identified as having lower quality data.

Yet another factor may be related to who prepared, used, or otherwise interacted with a data item. For example, the reputation or stature of the owner of the data item may be taken into account. Alternatively or additionally, entities who have been looking or using a data item (and in some cases how they use the data item) may be used to determine quality or relevance. Embodiments may allow for a sort of "crowd source" quality assessment based on factors such as user approval of data, user use of data, user rating of data, user sharing of data, etc.

Figure 2:
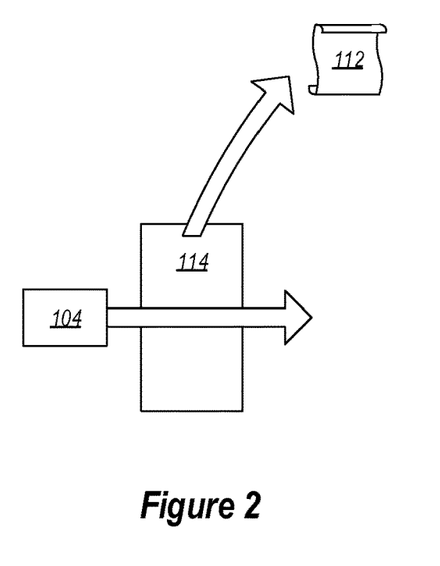
FIG. 2 illustrates analysis of a data item to generate quality metadata.

Determinations as to the quality of a data item may be made in any of a number of different ways. For example, simple threshold or comparisons may be made to assign a data source a data quality rating. Alternatively, Bayesian inference or machine learning may be used to resolve data item ratings. In another example, a user can manually determine quality and make an assignment of a data item quality rating. In some embodiments, a data cleanser As illustrated in FIG. 2, the data item 104 may be passed through an analysis module 114 that can generate the quality metadata 112. As noted, this may be done by various analysis methods. For example, comparison logic, Bayesian inference, completeness analysis, automatic grammar and sentence structure, and/or other analyses may be performed at the analysis module. Further still, the analysis module 114 may further include functionality for cleansing the data item 104 such that the quality metadata 112 may indicate the data item 104 is high quality data, because it has be cleansed by a data cleansing process.

In some embodiments, data quality may be determined by using data lineage. Lineage refers to the various sources of data and various operations that are performed on data at various points in the data's lifetime. In particular, with information about data sources and by annotating data assets with metadata about data quality, it is possible to use inference, machine learning, or other techniques to determine relative measures of data quality for datasets where no explicit assertion has been made.

Figure 3A:
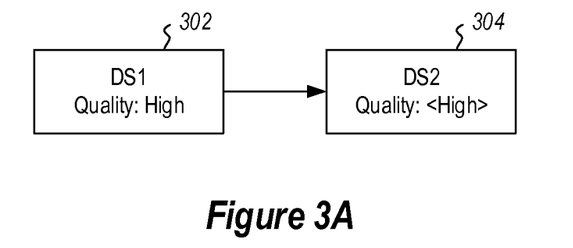
FIG. 3A illustrates an example of inference of quality metadata.

Most basically, data quality can be inferred from assertions about quality from which the data flows. For example, reference is directed to FIG. 3A. In FIG. 3A, the quality of the dataset DS2 illustrated at 302 is inferred to be <high> because the quality of the incoming data from the dataset DS1 illustrated at 304 is known to be high. A similar inference can be made with a low quality data source.

Figure 3B:
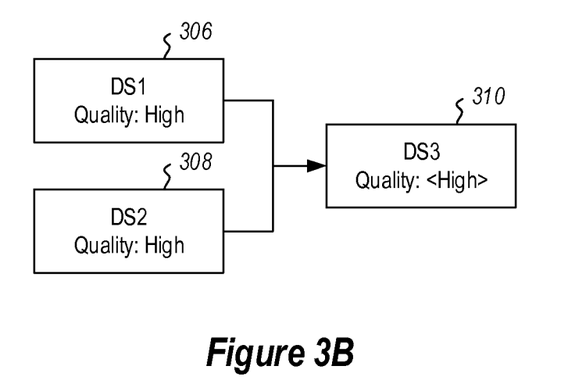
FIG. 3B illustrates another example of inference of quality metadata.

When there are multiple data sources, an inference can be made when all of the incoming data sources agree on the quality of the incoming data. For example, FIG. 3B illustrates an example where a dataset DS1 illustrated at 306 and a dataset DS2 illustrated at 308 are both high quality datasets. As such, a dataset DS3 illustrated at 310 derived from the datasets DS1 and DS2 can also be inferred to be a <high> quality dataset.

Figure 4:
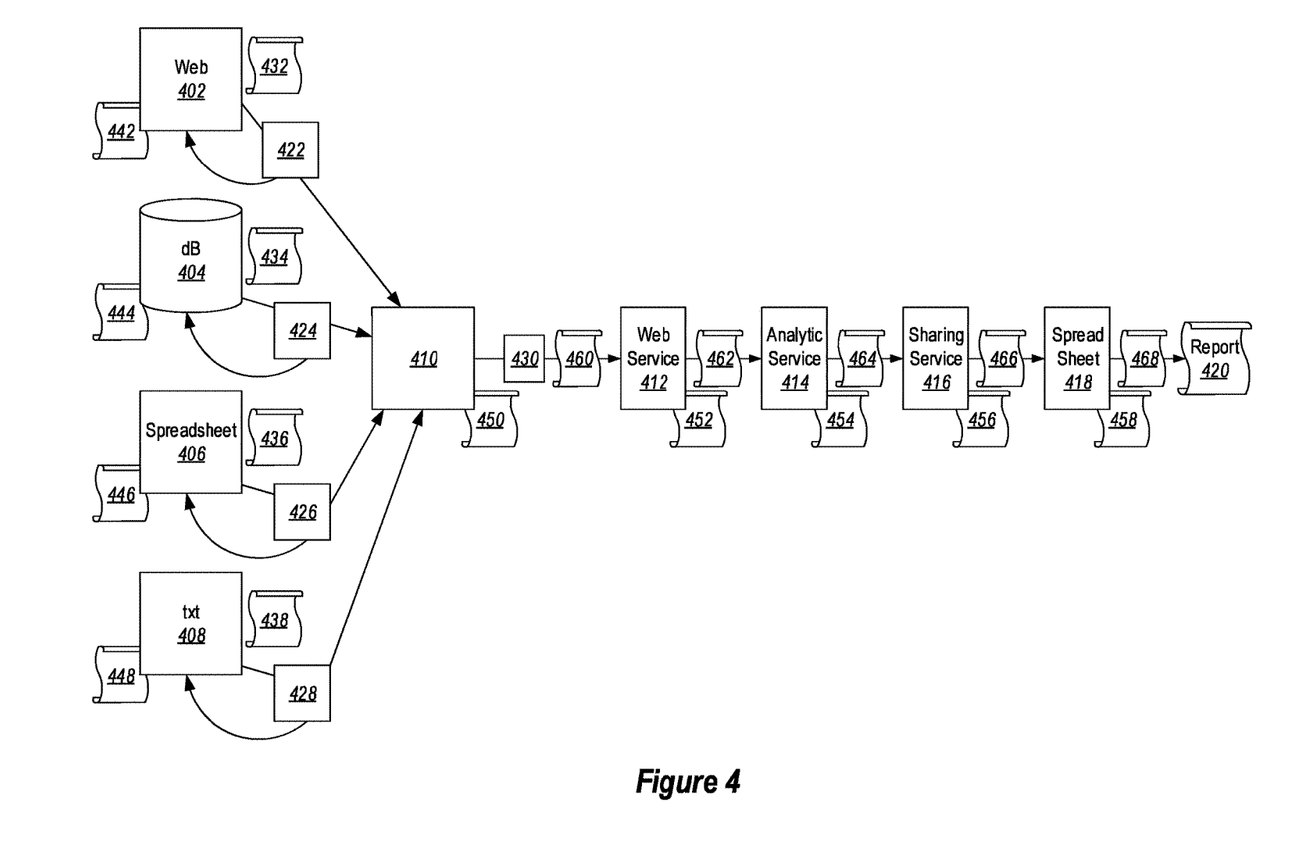
FIG. 4 illustrates data flow and inference of data quality.

Referring now to FIG. 4, additional lineage determinations of quality metadata are illustrated. In some embodiments, the lineage of a data source is used to infer the quality of the data source. Quality metadata about datasets can be associated with the datasets based on the lineage of the data and/or operations performed on the data.

Data lineage is the representation of how data moves through a system of connected data stores. An example is illustrated in FIG. 4. FIG. 4 illustrates various data sources including a web source 402, a database source 404, a spreadsheet source 406, and a text source (such as a text document) 408. Data from one or more of the sources may pass through one or more ETL (extract-transfer-load) processes (such as those in SQL Server® Integration Services, available from Microsoft Corporation of Redmond, Wash.), illustrated generally at 410. Various forms of input data may further travel along a dataflow 400 such as for example through a web service 412, to an analytic service 414, through a sharing service 416, through another spreadsheet 418, and finally be incorporated into a report 420.

In this case, the lineage of the data includes the web source 402, the database source 404, the spreadsheet source 406, the text source 408, the processes 410, the web service 412, the analytic service 414, the sharing service 416, and the spreadsheet 418. At each point in the lineage, the data has the opportunity to be transformed or changed.

Data sources, transformation, and/or operations can also be annotated with quality metadata. For example, FIG. 4 illustrates each of the data sources 402, 404, 406, and 408 associated with quality metadata 442, 444, 446, and 448 respectively. This quality metadata may be used to infer quality metadata for data sets produced by different data sources.

Similarly, embodiments may also be able to gather quality metadata 450, 452, 454 456, and 458 from various services 410, 412, 414, 416, and 418 respectively that indicates expected quality of datasets (or in some cases, actual measured or otherwise determined quality of datasets). The quality metadata can be assembled into one or more indexes that can be used for evaluation purposes. In some embodiments, the index can be used in system learning, such as, for example, via a machine learning process or explicit rule. For example, learning process or rule may note that the combination of two 'low' quality datasets combined in a particular way can produce a high quality dataset as output. Whenever the system observes this pattern being used again (those same two low datasets being combined in the same way), the new output is also likely high quality In alternative embodiments, various other algorithms may be used to determine data quality. For example, complex algorithms may be able to make a determination as to data quality based on the type of source, the quality of the source, the particular mix of sources being used (e.g. low quality sources that complement each other could be used to create high quality data, alternatively high quality sources that are deleterious to each other may actually cause output data to be low quality), etc. In some embodiments, these determinations may be accomplished using machine learning and/or statistical analysis, such as Bayesian inference.

Data sources can also be annotated with quality information when they are data cleansing processes which can occur as part of a data transform or as an action taken on a specific data source. Thus, quality metadata can be determined for a data set 104 by determining if the data has been through one or more cleansing processes. For example, FIG. 4 illustrates that the web source 402, the database source 404, the spreadsheet source 406, and the text source 408 each have associated with them a data cleansing process 422, 424, 426, 428 respectively. The data cleansing processes 422 through 428 are configured to automatically identify and correct problems with data from the data sources 402 through 408. Thus for example, datasets 432, 434, 336, and 438 can be sent from data sources 402, 404, 406, and 408 respectively. The data sources have associated with them data cleansing processes 422, 424, 426, and 428. The data cleansing processes 422, 424, 426, and 428, can receive the datasets 432, 434, 436, and 438 respectively, and identify issues such as incorrect or corrupted data, incomplete data, outdated data, non-relevant data, etc. and can perform corrective techniques such as filtering, data supplementation, re-requesting data, etc. to improve the quality of the datasets 432 through 438. FIG. 4 also illustrates a manual data cleansing process 430. The manual data cleansing process 430 can be initiated by a user to perform various data cleansing or verification processes. Depending on the nature and success of the cleansing processes, various levels of data quality can be indicated in quality metadata 112 for a data item 104 having undergone data cleansing.

The quality metadata 112 may be associated with the underlying data item 104 in a number of different ways. For example, in some embodiments, quality metadata 112 may be stored as part of a record storing the data item 104. For example, the quality metadata 112 may be stored in a corresponding column of a row for the data item 104 in a database. Alternatively or additionally, the quality metadata 112 may be stored in a header or a footer of a data structure for the data item 104. Alternatively or additionally, various index entries may be used to link the data item 104 to the quality metadata 112.

Figure 5:
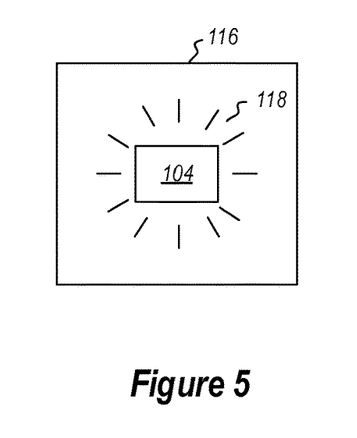
FIG. 5 illustrates a display and displaying an indication of data quality from quality metadata.

Various methods may exist for indicating to a user the quality of data based on the quality metadata. For example, FIG. 5 illustrates a display 116 displaying the data item 104. The data item may be displayed with a halo 118 or some other visual indicator indicating data quality. For example, if the quality metadata 112 indicates that the data item 104 is high quality data, the item may be displayed with a green halo, surrounded by a green border, or in some other appropriate fashion. If the metadata 112 indicates that the data item 104 is moderate or suspect quality, the data item 104 may be displayed with a yellow halo, yellow border, or other appropriate indicator. If the quality metadata 112 indicates that the data item 104 is of low quality, then the data item 104 may be displayed on the display 116 with a red halo 118, with a red border, or some other appropriate fashion.

In some embodiments, various intermediate colors, or even numerical representations may be displayed to represent data quality. For example, data quality may be indicated by using a 1 to 10 or 1 to 100 scale. Other appropriate indicators, visual or otherwise, may alternatively or additionally be used.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
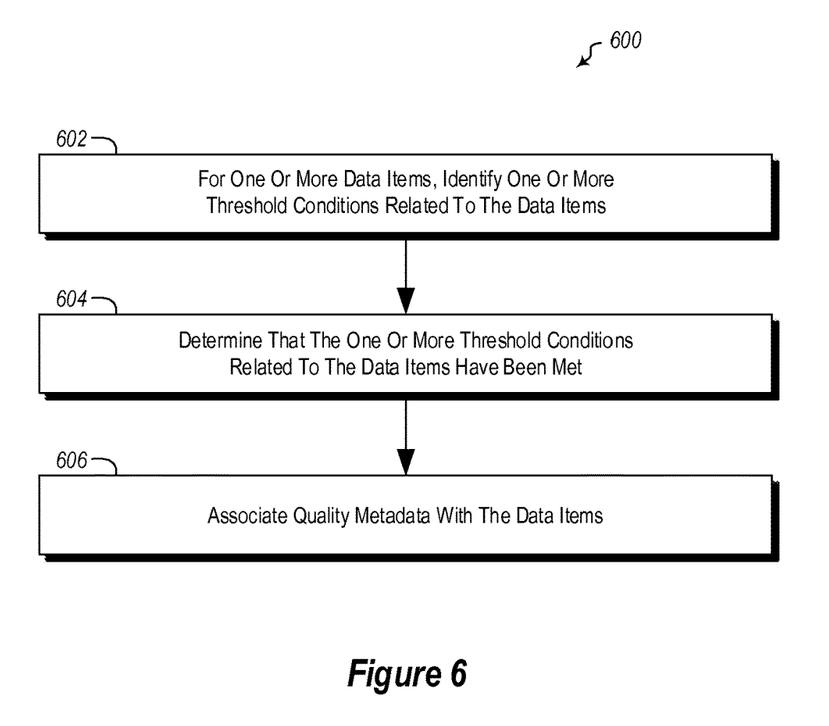
FIG. 6 illustrates a method of associating quality metadata with underlying data.

Referring now to FIG. 6, a method 600 is illustrated. The method 600 includes acts for associating quality metadata with underlying data. The method 600 includes, for one or more data items, identifying one or more threshold conditions related to the data items (act 602). Various example thresholds have been illustrated herein, and several examples are also illustrated below.

The method 600 further includes determining that the one or more threshold conditions related to the data items have been met (act 604).

As a result of determining that the one or more threshold conditions related to the data items have been met, the method 600 further includes associating quality metadata with the data items (act 606).

The method 600 may be practiced where the one or more threshold conditions comprises a condition that the data items are intended for a particular user or group of users. For example, embodiments may determine that the data item is intended to be consumed by members of a management group of a company. In some embodiments, the threshold condition may be specified by specifying an entity role.

Some embodiments of the method 600 may be implemented in a social media context or other group contexts. For example, the method 600 may be practiced where the one or more threshold conditions comprises a condition that the data items have been shared a threshold number of times. For example, the data item may have been shared on a social media platform or other appropriate platform. Alternatively or additionally, the method 600 may be practiced where the one or more threshold conditions comprises a condition that the data items have been liked a threshold number of times on a social media platform. Alternatively or additionally, the method 600 may be practiced where the one or more threshold conditions comprises a condition that the data items have been commented on a threshold number of times. For example, in some embodiments, the data items may have been commented on a threshold number of times on social media platform or other appropriate platform. Alternatively or additionally, the method 600 may be practiced where the one or more threshold conditions comprises a condition that the data items have been accessed a threshold number of times.

The method 600 may be practiced where the one or more threshold conditions comprises an indication that the data items are to be distributed to at least some threshold number of users. Thus for example, if it is known that a data item will be widely distributed, then quality metadata may be associated with the data item.

The method 600 may be practiced where quality metadata is generated as a result of the one or more threshold conditions being met. In particular, rather than using existing quality metadata, embodiments may perform actions to generate quality metadata once it is determined that the quality metadata is needed.

The method of claim 7, wherein the quality metadata is generated by applying a data analysis tool. For example, a data cleanser may be applied to the data. Data cleansers can identify deficiencies and try to correct them, or report on data deficiencies.

Alternatively, in some embodiments, the method 600 may be practiced where the quality metadata is obtained from a fact checking organization. For example, various fact checking organizations may exist and may fact check data included in data items. Various search and matching algorithms may be performed against such fact checking organizations to determine data quality for a data item as indicated by metadata at a fact checking organization.

Alternatively, in some embodiments, the method 600 may be practiced where one or more threshold conditions are applied to derived data items derived from the original data items. Thus, for example, data lineage may be used to calculate or determine thresholds. Thus, for example, as illustrated above, number of downstream views, downstream likes, downstream shares, access of downstream data by particular entities, etc. may trigger a data quality metadata association process.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of determining when quality metadata, which indicates a measure of the quality of underlying data corresponding to the quality metadata, should be associated with the underlying data and indicated to a user to provide assurance of the quality of the underlying data provided to the user, the computer-implemented method being performed by one or more processors when executing computer-executable instructions, and comprising:

receiving one or more data items from one or more sources of data;

identifying one or more threshold conditions related to the one or more data items, wherein the one or more threshold conditions comprise one or more threshold rules for social networking interactions with the one or more data items, the one or more threshold conditions comprising at least one of a threshold number of times the one or more data items have been accessed on a social media platform, a threshold number of times the one or more data items have been liked on a social media platform, a threshold number of times the one or more data items have been commented on on a social media platform, or a threshold number of times the one or more data items have been shared on a social media platform, wherein the threshold one or more threshold conditions are indicative of when underlying data should have quality metadata associated with the underlying data, wherein the quality metadata comprises an indication of the veracity of the one or more data items;

for the received one or more data items, the one or more processors determining that the one or more threshold conditions have been met;

as a result of determining that the one or more threshold conditions have been met, obtaining externally generated quality metadata that indicates a certain quality, including an indication of the veracity of the one or more data items;

as a result of determining that the one or more threshold conditions have been met, the one or more processors associating the quality metadata with the one or more data items for which the one or more threshold conditions was determined prior to presentation to a user;

storing the quality metadata, including the indication of the veracity of the one or more data items, in a data store containing a plurality of data items; and as a result of determining that the one or more threshold conditions have been met, displaying to a user an indicator indicating the veracity of the one or more data items together with the one or more data items.

2. The computer-implemented method of claim 1, wherein the one or more threshold conditions further comprises a condition that the one or more data items are being provided for a particular user or group of users.

3. The computer-implemented method of claim 1, wherein the one or more threshold conditions comprises a condition that the one or more data items have been shared a threshold number of times on a social media platform.

4. The computer-implemented method of claim 1, wherein the one or more threshold conditions comprises a condition that the one or more data items have been liked a threshold number of times on a social media platform.

5. The computer-implemented method of claim 1, wherein the one or more threshold conditions comprises a condition that the one or more data items have been commented on a threshold number of times on a social media platform.

6. The computer-implemented method of claim 1, wherein the one or more threshold conditions further comprises a condition that the one or more data items are to be distributed to at least some threshold number of users.

7. The computer-implemented method of claim 1, wherein the quality metadata is based on an inference as to quality of data provided from one or more sources of the one or more data items.

8. The computer-implemented method of claim 7, wherein the quality metadata is generated as a result of applying a data cleanser to the one or more data items that removes incorrect or corrupted data from the one or more data items and generates the quality metadata indicating that the one or more data items are accurate.

9. The computer-implemented method of claim 1, wherein the quality metadata is based on the lineage of data, including how the data has moved through a system of connected data stores from which the one or more data items was obtained.

10. A computer program product comprising a computer storage device containing computer-executable instructions which, when executed by one or more processors, cause the one or more processors to implement a computer-implemented method of determining when quality metadata, which indicates a measure of the quality of underlying data corresponding to the quality metadata, should be associated with the underlying data and indicated to a user to provide assurance of the quality of the underlying data provided to the user, and wherein the computer-implemented method comprises:

receiving one or more data items from one or more sources of data;

identifying one or more threshold conditions related to the one or more data items, wherein the one or more threshold conditions comprise one or more threshold rules for social networking interactions with the one or more data items, the one or more threshold conditions comprising at least one of a threshold number of times the one or more data items have been accessed on a social media platform, a threshold number of times the one or more data items have been liked on a social media platform, a threshold number of times the one or more data items have been commented on on a social media platform, or a threshold number of times the one or more data items have been shared on a social media platform, wherein the one or more threshold conditions are indicative of when underlying data should have quality metadata associated with the underlying data, wherein the quality metadata comprises an indication of the veracity of the one or more data items;

for the received one or more data items, the one or more processors determining that the one or more threshold conditions have been met;

as a result of determining that one or more threshold conditions have been met, obtaining externally generated quality metadata that indicates a certain quality, including an indication of the veracity of the one or more data items;

as a result of determining that the one or more threshold conditions have been met, the one or more processors associating the quality metadata with the one or more data items for which the one or more threshold conditions was determined prior to presentation to a user;

storing the quality metadata, including the indication of the veracity of the one or more data items, in a data store containing a plurality of data items; and as a result of determining that the one or more threshold conditions have been met, displaying to a user an indicator indicating the veracity the one or more data items together with the one or more data items.

11. The computer program product of claim 10, wherein the one or more threshold conditions further comprises a condition that the one or more data items are being provided for a particular user or group of users.

12. The computer program product of claim 10, wherein the one or more threshold conditions comprises a condition that the one or more data items have been shared a threshold number of times on a social media platform.

13. The computer program product of claim 10, wherein the one or more threshold conditions comprises a condition that the one or more data items have been liked a threshold number of times on a social media platform.

14. The computer program product of claim 10, wherein the one or more threshold conditions comprises a condition that the one or more data items have been commented on a threshold number of times on a social media platform.

15. The computer program product of claim 10, wherein the one or more threshold conditions further comprises a condition that the one or more data items are to be distributed to at least some threshold number of users.

16. The computer program product of claim 10, wherein the quality metadata is based on an inference as to quality of data provided from one or more sources of the one or more data items.

17. The computer program product of claim 16, wherein the quality metadata is generated as a result of applying a data cleanser to the one or more data items that removes incorrect or corrupted data from the one or more data items and generates the quality metadata indicating that the one or more data items are accurate.

18. A system comprising:

one or more processors;

a data store containing a plurality of data items;
a computer storage device containing computer-executable instructions which, when executed by the one or more processors, cause the one or more processors to implement a computer-implemented method of determining when quality metadata, which indicates a measure of the quality of underlying data corresponding to the quality metadata, should be associated with the underlying data and indicated to a user to provide assurance of the quality of the underlying data provided to the user, and wherein the computer-implemented method comprises:
receiving one or more data items from one or more sources of data;
identifying one or more threshold conditions related to the one or more data items, wherein the one or more threshold conditions comprise one or more threshold rules for social networking interactions with the one or more data items, the one or more threshold conditions comprising at least one of a threshold number of times the one or more data items have been accessed on a social media platform, a threshold number of times the one or more data items have been liked on a social media platform, a threshold number of times the one or more data items have been commented on on a social media platform, or a threshold number of times the one or more data items have been shared on a social media platform, wherein the one or more threshold conditions are indicative of when underlying data should have quality metadata associated with the underlying data, wherein the quality metadata comprises an indication of the veracity of the one or more data items;
for the received one or more data items, the one or more processors determining that the one or more threshold conditions have been met;
as a result of determining that the one or more threshold conditions have been met, obtaining externally generated quality metadata that indicates a certain quality, including an indication of the veracity of the one or more data items
as a result of determining that the one or more threshold conditions have been met, the one or more processors associating the quality metadata with the one or more data items for which the one or more threshold conditions was determined prior to presentation to a user;
storing the quality metadata, including the indication of the veracity of the one or more data items, in a data store containing a plurality of data items; and
as a result of determining that the one or more threshold conditions have been met, displaying to a user an indicator indicating the veracity the one or more data items together with the one or more data items.

19. The system of claim 18, wherein the one or more threshold conditions comprises a condition that the one or more data items have been shared a threshold number of times on a social media platform.

20. The system of claim 18, wherein the one or more threshold conditions comprises a condition that the one or more data items have been liked a threshold number of times on a social media platform.

* * * * *